United States Patent
Taherzadeh Boroujeni et al.

(10) Patent No.: US 12,381,760 B2
(45) Date of Patent: Aug. 5, 2025

(54) CONTROL CHANNEL MONITORING AGGREGATION WITH BLENDED RESOURCE ELEMENT GROUP (REG) BUNDLES

(71) Applicant: QUALCOMM Incorporated, San Diego, CA (US)

(72) Inventors: Mahmoud Taherzadeh Boroujeni, San Diego, CA (US); Juan Montojo, San Diego, CA (US); Tao Luo, San Diego, CA (US); Peter Gaal, San Diego, CA (US); Iyab Issam Sakhnini, San Diego, CA (US); Jelena Damnjanovic, Del Mar, CA (US); Xiaoxia Zhang, San Diego, CA (US); Junyi Li, Fairless Hills, PA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 17/331,468

(22) Filed: May 26, 2021

(65) Prior Publication Data

US 2021/0409244 A1    Dec. 30, 2021

Related U.S. Application Data

(60) Provisional application No. 63/044,867, filed on Jun. 26, 2020.

(51) Int. Cl.
*H04L 25/02*    (2006.01)
*H04L 5/00*    (2006.01)
*H04W 24/08*    (2009.01)
*H04W 24/10*    (2009.01)
*H04W 72/23*    (2023.01)

(52) U.S. Cl.
CPC ........ *H04L 25/024* (2013.01); *H04L 25/0204* (2013.01); *H04W 24/10* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 8,126,210 B2 | 2/2012 | Fardi | |
| 2016/0309400 A1* | 10/2016 | Swaminathan | H04W 84/02 |
| 2018/0368116 A1* | 12/2018 | Liao | H04W 76/27 |
| 2019/0158326 A1* | 5/2019 | Liao | H04L 5/0051 |
| 2019/0182807 A1* | 6/2019 | Panteleev | H04L 5/0048 |
| 2020/0351896 A1* | 11/2020 | Taherzadeh Boroujeni | H04L 5/0051 |
| 2021/0212098 A1* | 7/2021 | Yoon | H04W 72/046 |
| 2021/0314927 A1* | 10/2021 | Noh | H04L 5/0053 |
| 2021/0352633 A1* | 11/2021 | Tiirola | H04L 5/0053 |

(Continued)

*Primary Examiner* — Jeffrey M Rutkowski
*Assistant Examiner* — Ning Li
(74) *Attorney, Agent, or Firm* — Patterson & Sheridan, L.L.P/Qualcomm Incorporated

(57) ABSTRACT

Certain aspects of the subject matter described in this disclosure can be implemented in a method for wireless communication. The method generally includes generating a resource element group (REG) bundle for channel estimation, the REG bundle having a plurality of REGs to be transmitted in a plurality of monitoring occasions; and transmitting, to a user equipment (UE), the REG bundle using the plurality of monitoring occasions.

26 Claims, 8 Drawing Sheets

(56) References Cited

U.S. PATENT DOCUMENTS

| | | | | |
|---|---|---|---|---|
| 2021/0360523 | A1* | 11/2021 | Hwang | H04L 5/0091 |
| 2021/0399858 | A1* | 12/2021 | Yang | H04L 5/001 |
| 2022/0046452 | A1* | 2/2022 | Jiao | H04L 5/0053 |
| 2022/0132341 | A1* | 4/2022 | Lee | H04W 72/0446 |
| 2022/0132342 | A1* | 4/2022 | Kim | H04W 74/0816 |
| 2022/0173867 | A1* | 6/2022 | Nogami | H04L 5/001 |
| 2022/0182943 | A1* | 6/2022 | Maleki | H04W 68/025 |
| 2022/0303795 | A1* | 9/2022 | Bala | H04W 24/08 |
| 2022/0322118 | A1* | 10/2022 | Kim | H04L 5/0053 |
| 2022/0368489 | A1* | 11/2022 | Grant | H04L 5/001 |
| 2023/0048976 | A1* | 2/2023 | Li | H04L 5/0035 |
| 2023/0180249 | A1* | 6/2023 | Bala | H04W 52/028 |
| | | | | 370/329 |
| 2023/0189147 | A1* | 6/2023 | Bala | H04W 68/02 |
| | | | | 370/311 |

* cited by examiner

CONTROL CHANNEL MONITORING AGGREGATION WITH BLENDED RESOURCE ELEMENT GROUP (REG) BUNDLES

CROSS-REFERENCE TO RELATED APPLICATION(S)

This application claims benefit of and priority to U.S. Provisional Application No. 63/044,867 filed Jun. 26, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for control channel communication.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved control channel communication.

Certain aspects of the subject matter described in this disclosure can be implemented in a method for wireless communication by a base station (BS). The method generally includes generating a resource element group (REG) bundle for channel estimation, the REG bundle having a plurality of REGs to be transmitted in a plurality of monitoring occasions; and transmitting, to a user-equipment (UE), the REG bundle using the plurality of monitoring occasions.

Certain aspects of the subject matter described in this disclosure can be implemented in a method for wireless communication by a UE. The method generally includes receiving a REG bundle for channel estimation, the REG bundle having a plurality of REGs to be received in a plurality of monitoring occasions; performing the channel estimation based on the REG bundle; and decoding a control channel based on the channel estimation.

Certain aspects of the subject matter described in this disclosure can be implemented in an apparatus for wireless communication by a BS. The apparatus generally includes a memory; and one or more processors coupled to the memory, the one or more processors and the memory being configured to: generate a REG bundle for channel estimation, the REG bundle having a plurality of REGs to be transmitted in a plurality of monitoring occasions; and transmit, to a UE, the REG bundle using the plurality of monitoring occasions.

Certain aspects of the subject matter described in this disclosure can be implemented in an apparatus for wireless communication by a UE. The apparatus generally includes a memory; and one or more processors coupled to the memory, the one or more processors and the memory being configured to: receive a REG bundle for channel estimation, the REG bundle having a plurality of REGs to be received in a plurality of monitoring occasions; perform the channel estimation based on the REG bundle; and decode a control channel based on the channel estimation.

Certain aspects of the subject matter described in this disclosure can be implemented in an apparatus for wireless communication by a BS. The apparatus generally includes means for generating a REG bundle for channel estimation, the REG bundle having a plurality of REGs to be transmitted in a plurality of monitoring occasions; and means for transmitting, to a UE, the REG bundle using the plurality of monitoring occasions.

Certain aspects of the subject matter described in this disclosure can be implemented in an apparatus for wireless communication by a UE. The apparatus generally includes means for receiving a REG bundle for channel estimation, the REG bundle having a plurality of REGs to be received in a plurality of monitoring occasions; means for performing the channel estimation based on the REG bundle; and means for decoding a control channel based on the channel estimation.

Certain aspects of the subject matter described in this disclosure can be implemented in a computer-readable medium having instructions stored thereon to cause a BS to: generate a REG bundle for channel estimation, the REG bundle having a plurality of REGs to be transmitted in a plurality of monitoring occasions; and transmit, to a UE, the REG bundle using the plurality of monitoring occasions.

Certain aspects of the subject matter described in this disclosure can be implemented in a computer-readable medium having instructions stored thereon to cause a UE to: receive a REG bundle for channel estimation, the REG bundle having a plurality of REGs to be received in a plurality of monitoring occasions; perform the channel estimation based on the REG bundle; and decode a control channel based on the channel estimation.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
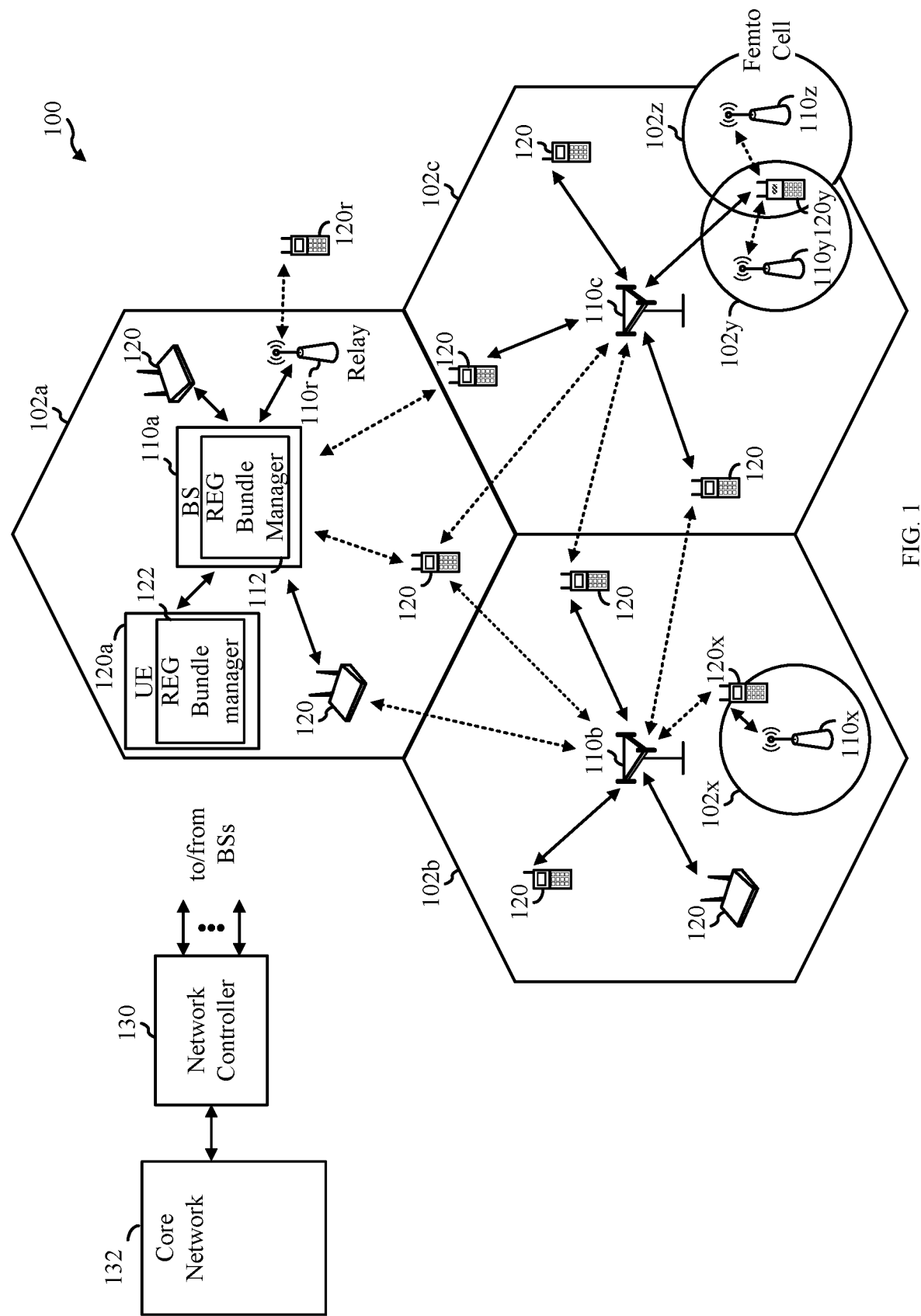
FIG. 1 is a block diagram conceptually illustrating an example telecommunications system, in accordance with certain aspects of the present disclosure.

Aspects of the present disclosure provide apparatus, methods, processing systems, and computer readable mediums for blending resource element group (REG) bundles to form a virtual REG bundle across aggregated monitoring occasions. In some scenarios, a communication channel may experience degraded coverage and low signal-to-interference-plus-noise-ration (SINR). Channel estimation may be used to improve channel coverage. Larger REG bundles may be used for enhancing channel estimation, allowing for greater improvement of channel coverage by increasing SINR. Certain aspects of the present disclosure provide techniques for physical downlink control channel (PDCCH) monitoring aggregation to achieve additional enhancements for channel estimation. In other words, for PDCCH monitoring aggregation, REG bundles associated with different monitoring occasions of a search space may be grouped together to create larger virtual REG bundles.

The following description provides examples of control channel transmission and monitoring in communication systems, and is not limiting of the scope, applicability, or examples set forth in the claims. Changes may be made in the function and arrangement of elements discussed. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTIs) to meet respective quality of service (QoS) requirements. In addition, these services may co-exist in the same subframe. NR supports beamforming and beam direction may be dynamically configured. MIMO transmissions with precoding may also be supported. MIMO configurations in the downlink (DL) may support up to 8 transmit antennas with multi-layer DL transmissions up to 8 streams and up to 2 streams per user equipment (UE). Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may be in communication with one or more base station (BSs) 110 and/or UE 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for communication of REG bundles. As shown in FIG. 1, the BS 110a includes a REG bundle manager 112. The REG bundle manager 112 may be configured to blend REG bundles across multiple monitoring occasions to form a virtual REG bundle, in accordance with aspects of the present disclosure. As shown in FIG. 1, the UE 120a includes a REG bundle manager 122. The REG bundle manager 122 may be configured to receive a virtual REG bundle formed by blending REG bundles across multiple monitoring occasions, in accordance with aspects of the present disclosure.

Figure 2:
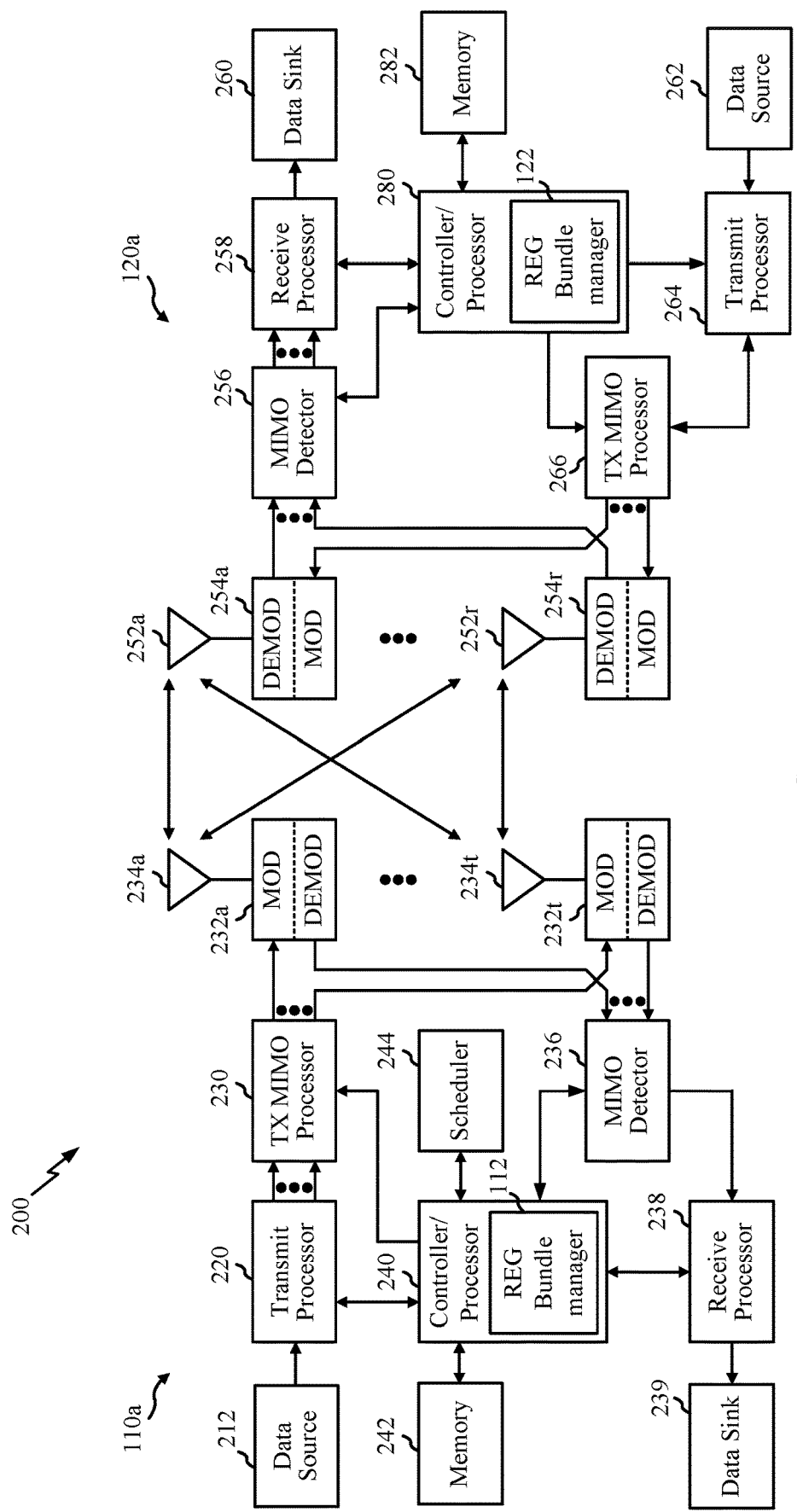
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid automatic repeat request (ARQ) indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for orthogonal frequency division multiplexing (OFDM), etc.) to obtain an output sample stream. Each modulator may further process (e.g., convert to analog, amplify, filter, and upconvert) the output sample stream to obtain a DL signal. DL signals from modulators 232a-232t may be transmitted via the antennas 234a-234t, respectively.

At the UE 120a, the antennas 252a-252r may receive the DL signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink (UL), at UE 120a, a transmit processor 264 may receive and process data (e.g., for the PUSCH) from a data source 262 and control information (e.g., for the physical uplink control channel (PUCCH) from the controller/processor 280. The transmit processor 264 may also generate reference symbols for a reference signal (RS) (e.g., for the sounding reference signal (SRS)). The symbols from the transmit processor 264 may be precoded by a TX MIMO processor 266 if applicable, further processed by the modulators in transceivers 254a-254r (e.g., for single-carrier frequency division multiplexing (SC-FDM), etc.), and transmitted to the BS 110a. At the BS 110a, the UL signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the DL and/or UL.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has the REG bundle manager 112, according to certain aspects described herein. As shown in FIG. 2, the controller/processor 280 of the UE 120a has the REG bundle manager 122, according to aspects described herein. Although shown at the controller/processor, other components of the UE 120a and BS 110a may be used to perform the operations described herein.

NR may utilize OFDM with a cyclic prefix (CP) on the UL and DL. NR may support half-duplex operation using time division duplexing (TDD). OFDM and SC-FDM may partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Figure 3:
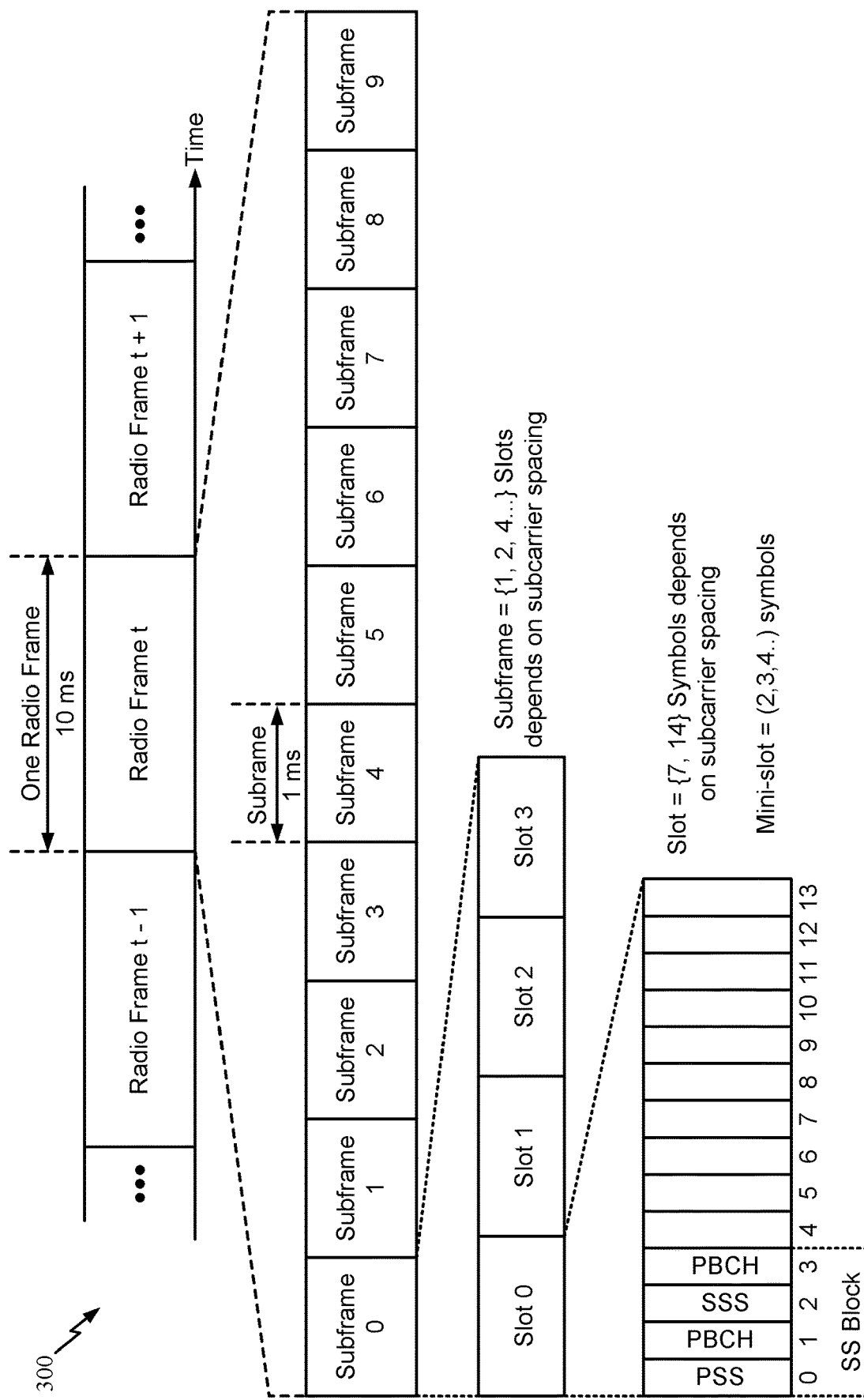
FIG. 3 is an example frame format for new radio (NR), in accordance with certain aspects of the present disclosure.

FIG. 3 is a diagram showing an example of a frame format 300 for NR. The transmission timeline for each of the DL and UL may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Techniques for Control Channel Monitoring Aggregation with Blended Resource Element Group (REG) Bundles In new radio (NR), a physical downlink control channel (PDCCH) is transmitted over a Control Resource Set (CORESET). The CORESET may have 1, 2, or 3 orthogonal frequency-division multiplexing (OFDM) symbols. A set of potential PDCCH candidates is referred to as a search space and is associated with a control resource set (CORESET). The PDCCH candidates may be monitored for in configurable monitoring occasions having a configured periodicity (e.g., in terms of number of slots) and may be a set of symbols indicating a beginning of each monitoring occasion in a monitored slot. In other words, there may be multiple monitoring occasions per slot. Increasing the number of OFDM symbols for PDCCH transmission is a way to increase the coverage of PDCCH. In some aspects, a group-common downlink control information (DCI) may be used to activate a preconfigured monitoring aggregation (e.g., a grouping of PDCCH monitoring occasions for repetition of the same PDCCH).

In some aspects, a set of 2, 3, or 6 adjacent resource element groups (REGs) (in time and/or frequency) may be configured as a REG bundle to be used for channel estimation. For example, REGs that form a REG bundle may be generated using the same precoder and have reference signals (RSs) (e.g., demodulation reference signals (DMRSs)) for estimating a channel and decoding control information of a PDCCH based on the channel estimation. Larger REG bundles may be useful for enhanced channel estimation, especially for a case of limited coverage and low signal-to-interference-plus-noise-ration (SINR). Certain aspects of the present disclosure provide techniques for PDCCH monitoring aggregation to achieve additional enhancements, such as enhanced channel estimation, as described in more detail herein.

Figure 4:
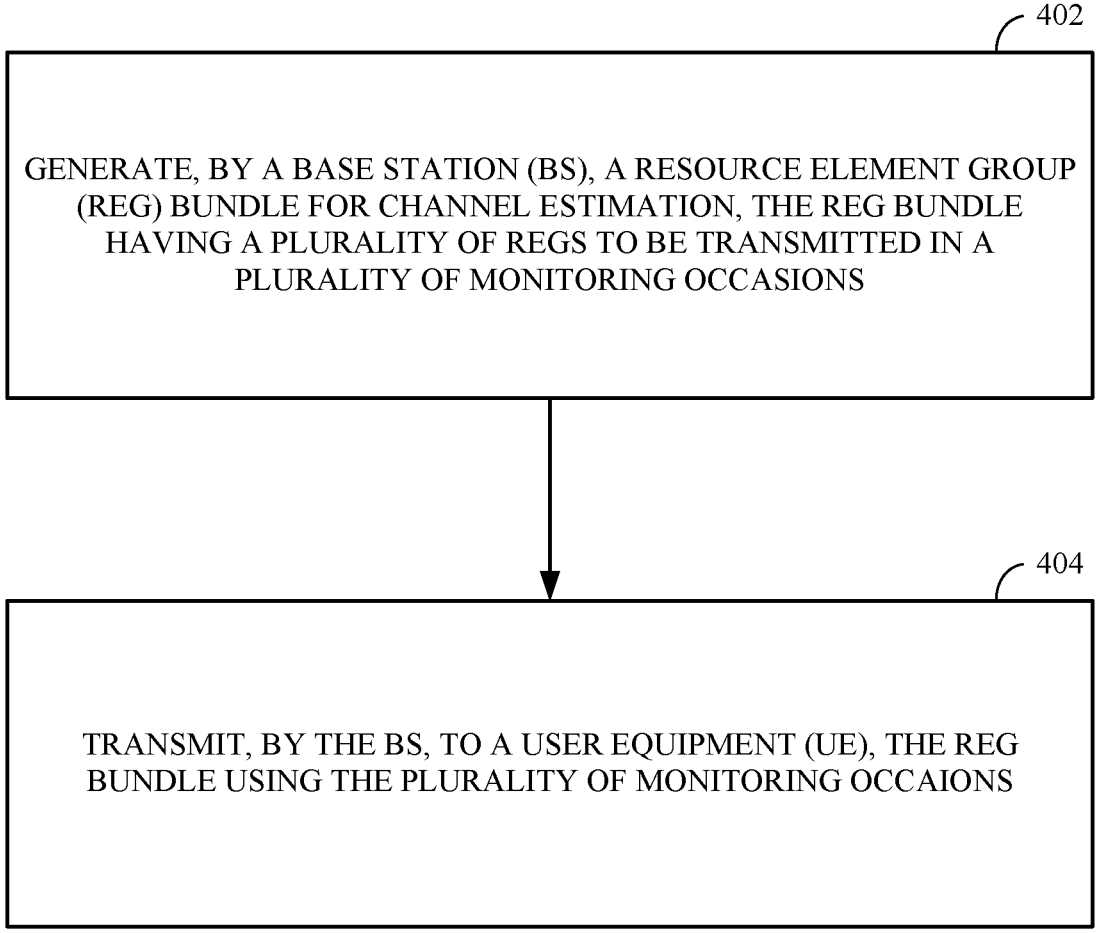
FIG. 4 is a flow diagram illustrating example operations for wireless communication by a BS, in accordance with certain aspects of the present disclosure.

FIG. 4 is a flow diagram illustrating example operations 400 for wireless communication by a base station (BS), in accordance with certain aspects of the present disclosure. The operations 400 may be performed, for example, by BS 110a in the wireless communication network 100.

Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2) and some or all of a transmit chain (e.g., transmit processor 220, TX MIMO processor 230, and modulator 232) or some or all of a receive chain (e.g., modulator/demodulator 232, MIMO detector 236, and receive processor 238). In certain aspects, the transmission and/or reception of signals by the BS may be implemented via a bus interface of one or more processors (e.g., controller/processor 240) for obtaining and/or outputting signals.

Operations 400 may begin, at block 402, by a BS generating a REG bundle for channel estimation, the REG bundle having a plurality of REGs to be transmitted in a plurality of monitoring occasions. For example, the plurality of monitoring occasions may be aggregated in a search space for communication of DCI. At block 404, the BS transmits, to a user equipment (UE), the REG bundle using the plurality of monitoring occasions.

Figure 5:
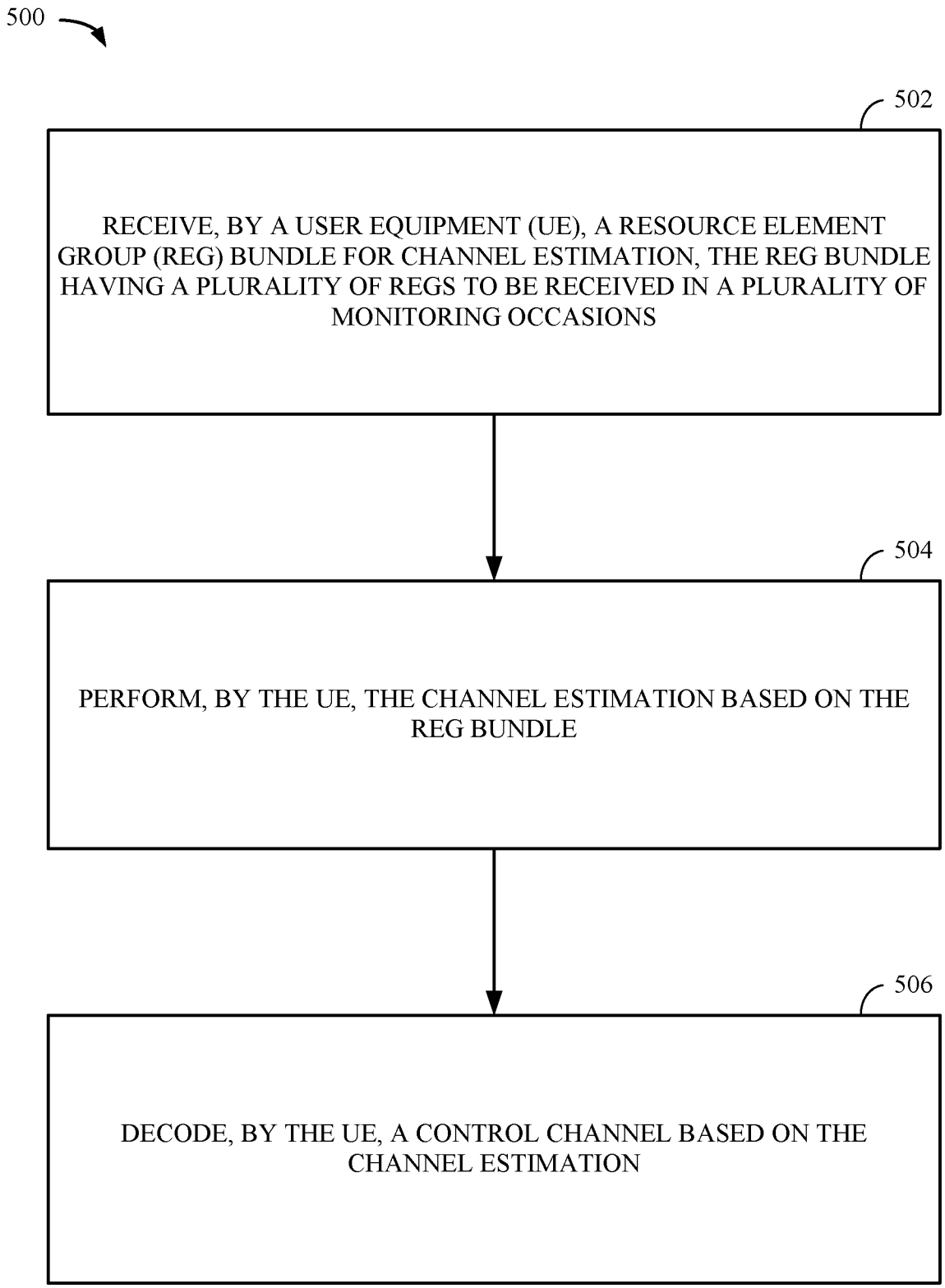
FIG. 5 is a flow diagram illustrating example operations for wireless communication by a UE, in accordance with certain aspects of the present disclosure.

FIG. 5 is a flow diagram illustrating example operations 500 for wireless communication by a UE, in accordance with certain aspects of the present disclosure. The operations 500 may be performed, for example, by UE 120*a* in the wireless communication network 100. Operations 500 may be complementary operations by the UE to the operations 400 performed by the BS in FIG. 4.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2) and some or all of a transmit chain (e.g., transmit processor 264, TX MIMO processor 266, and modulator 254) or some or all of a receive chain (e.g., modulator/demodulator 254, MIMO detector 256, and receive processor 258). In certain aspects, the transmission and/or reception of signals by the UE may be implemented via a bus interface of one or more processors (e.g., controller/processor 280) obtaining and/or outputting signals.

The operations 500 may begin, at block 502, by a UE receiving a REG bundle for channel estimation, the REG bundle having a plurality of REGs to be received in a plurality of monitoring occasions. For example, the plurality of monitoring occasions may be aggregated in a search space for communication of DCI. At block 504, the UE performs the channel estimation based on the REG bundle, and at block 506, the UE decodes a control channel based on the channel estimation.

Figure 6:
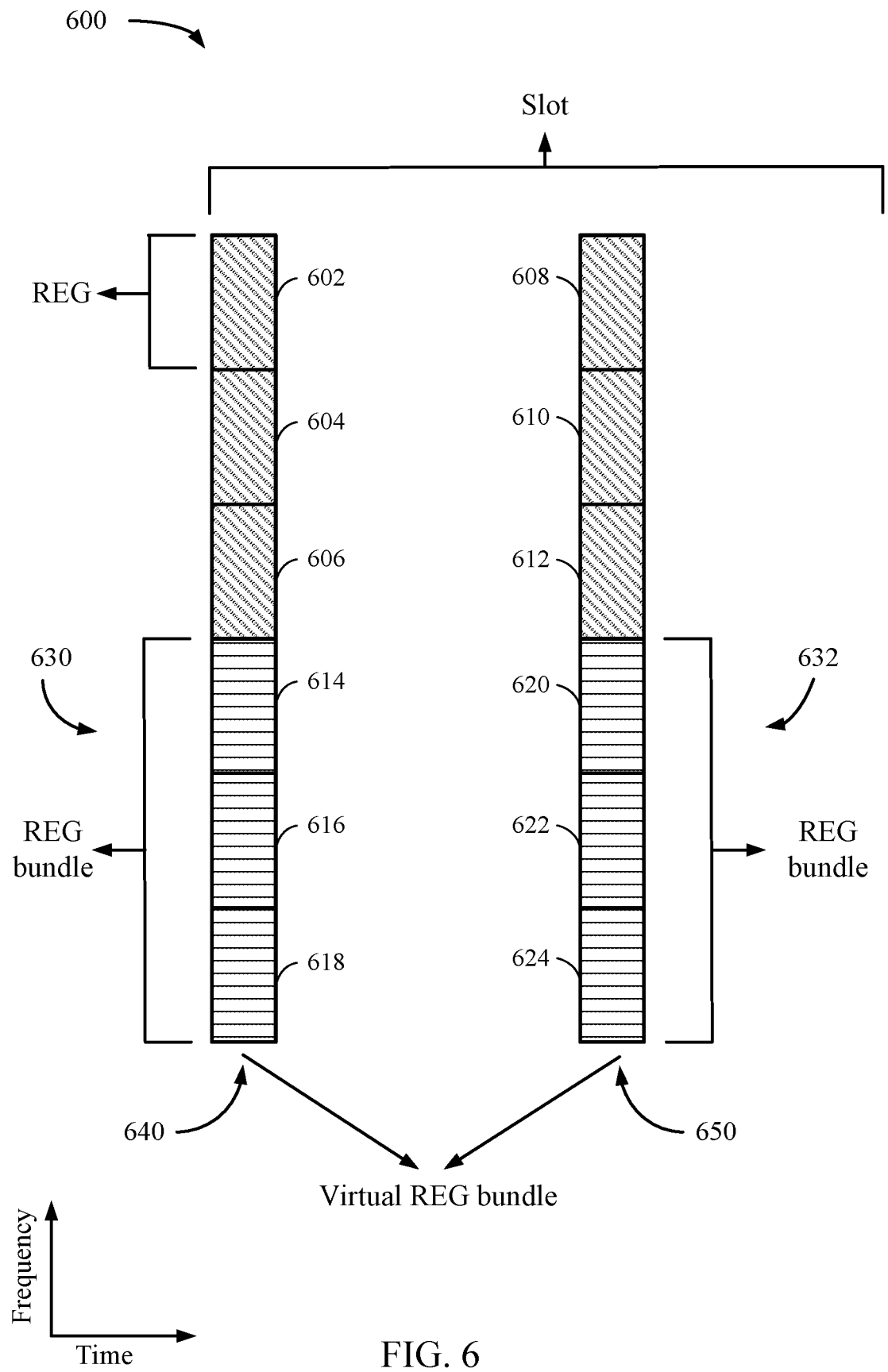
FIG. 6 illustrates example operations for resource element group (REG) bundle blending, in accordance with certain aspects of the present disclosure.

FIG. 6 illustrates a slot 600 having blended REG bundles to form a virtual REG bundle, in accordance with certain aspects of the present disclosure. For example, the slot 600 may include REGs 602, 604, 606 on a first monitoring occasion 640, and REGs 608, 610, 612 on a second monitoring occasion 650. The monitoring occasions 640, 650 may be aggregated to communicate DCI via one or more of REGs 602, 604, 606, 608, 610, 612. As illustrated, the first monitoring occasion 640 may include a REG bundle 630 having REGs 614, 616, 618, while the second monitoring occasion 650 may include a REG bundle 632 having REGs 620, 622, 624. The REG bundles 630, 632 may be configured to form a virtual REG bundle for channel estimation. For example, the REG bundles 630, 632 may include RSs (DMRSs) and may be transmitted using the same precoder, allowing the UE to estimate the channel and decode the control information transmitted in the slot 600. As illustrated, the REG bundles may be transmitted at different points in time, but using the same frequency resources.

In other words, for PDCCH monitoring aggregation, REG bundles associated with different monitoring occasions of a search space may be grouped together to create larger virtual REG bundles (e.g., to be used for channel estimation). The larger virtual REG bundle may include at least 2 REGs not associated with the same monitoring occasion. For example, the larger virtual REG bundle may include at least a first REG bundle associated with a first monitoring occasion and a second REG bundle associated with a second monitoring occasion. A virtual REG bundle may include multiple regular REG bundles on multiple monitoring occasions, associated with the same set of frequency RBs. Grouping of REG bundles may be conditioned on having a small distance in time and/or being in the same slot. In other words, blending of REG bundles across monitoring occasions may only be implemented if the gap in time between the monitoring occasions is not larger than a certain threshold. For example, phase continuity of RSs across monitoring occasions should be maintained for channel estimation; however if the time gap is greater than a threshold (also referred to herein as a time threshold), it may not be possible to maintain phase continuity of RSs across the monitoring occasions. This threshold may be in terms of a quantity of OFDM symbols or an absolute time length (e.g. in terms of milliseconds or microseconds). In some cases, the threshold may be set by standard specification or may be configured. In some cases, an indication of the threshold may be dynamically signaled by the BS to the UE. In some aspects, the UE may transmit a recommendation of the threshold to the BS, based on channel measurements (or its conditions/mobility state, e.g. its speed or being stationary) and/or based on phase continuity conditions. In such a case, the BS may determine the threshold by considering the recommendation from the UE.

In certain aspects, the preconfigured REG bundle blending may be activated implicitly when PDCCH monitoring aggregation is configured. For example, signaling (e.g., first signaling) configuring the UE with a plurality of monitoring occasions to be activated may also implicitly activate usage of REG bundle blending. In certain aspects, the preconfigured REG bundle blending may be activated separately from the configuration of PDCCH monitoring aggregation. For example, signaling (e.g., first signaling) used to configure the UE with a plurality of monitoring occasions to be activated may be different than signaling (e.g., second signaling) used to activate usage of the REG bundle blending across the plurality of monitoring occasions. Signaling for the configuration of PDCCH monitoring aggregation and/or the explicit activation of REG bundle blending may be at least one of semi-static via radio resource control (RRC) configuration, and/or dynamic via medium access control (MAC)-control element (CE), UE-specific DCI, or group-common DCI. For example, first signaling for configuring the UE with a plurality of monitoring occasions to be aggregated may be RRC signaling, and the second signaling activating usage of a REG bundle implemented across the plurality of monitoring occasions may be MAC-CE, UE-specific DCI, or group-common DCI.

In a search space, monitoring occasions may be configured when the search space is configured. When the monitoring occasions are configured, UEs may know that REG bundle blending may be configured across the monitoring occasions. The REG bundle blending may be activated, separately from the configuration of the monitoring occasions, as described herein. Once activated, the UEs know that the REG bundles across the monitoring occasions form a virtual REG bundle by using the same precoder. Although REG bundle blending may be activated for monitoring occasions, some UEs may not be able to use the virtual REG bundle for channel estimation due to limitations at the UE (e.g., the UE's capability). In this case, the UE may perform channel estimation using conventional techniques (e.g., using a REG bundle of a single monitoring occasion).

According to certain aspects, REG bundle blending across monitoring occasions may be implemented under one or more conditions. In some cases, the one or more conditions may include the size of an associated CORESET (e.g., in terms of a number of RBs and/or OFDM symbols). In some cases, the one or more conditions may also include the size and/or type of REG bundles. For example, REG bundle blending may be implemented for REG bundles of a size greater than a threshold. In some cases, REG bundle blending may be applied when the associated REG bundles are more than 1 RB in frequency. In some other cases, REG bundle blending may not be applicable, for example, for REG bundles that only have 1 RB in frequency, but 2 or more symbols in time.

In some other cases, the one or more conditions may be associated with a frequency range and/or subcarrier spacing (SCS) of the control channel (e.g., REG bundle blending may be applicable for larger SCS translating to smaller OFDM symbols, and/or higher frequency bands/ranges such as FR2, FR3, or FR4, but not for FR1 (e.g., sub-6 GHz NR). In some cases the one or more conditions may also be associated with the type of search space. For example, the REG bundle blending may be implemented for a UE-specific search space or a common search space.

In some cases, the one or more conditions may be associated with a format of the slot with multiple monitoring occasions (e.g., slot 600 of FIG. 6). For example, REG bundling may be implemented based on whether symbols between two monitoring occasions are all DL symbols. In particular, the symbols between the monitoring occasions being all DL symbols may allow for phase continuity between the REG bundles being blended to form a virtual REG bundle, as described herein.

In some cases, the one or more conditions may include whether there is an uplink (UL) transmission configured between the monitoring occasions. In other words, the REG bundle blending may be implemented if no UL transmissions exist between the monitoring occasions, such that phase continuity may be maintained.

Example Wireless Communications Devices

Figure 7:
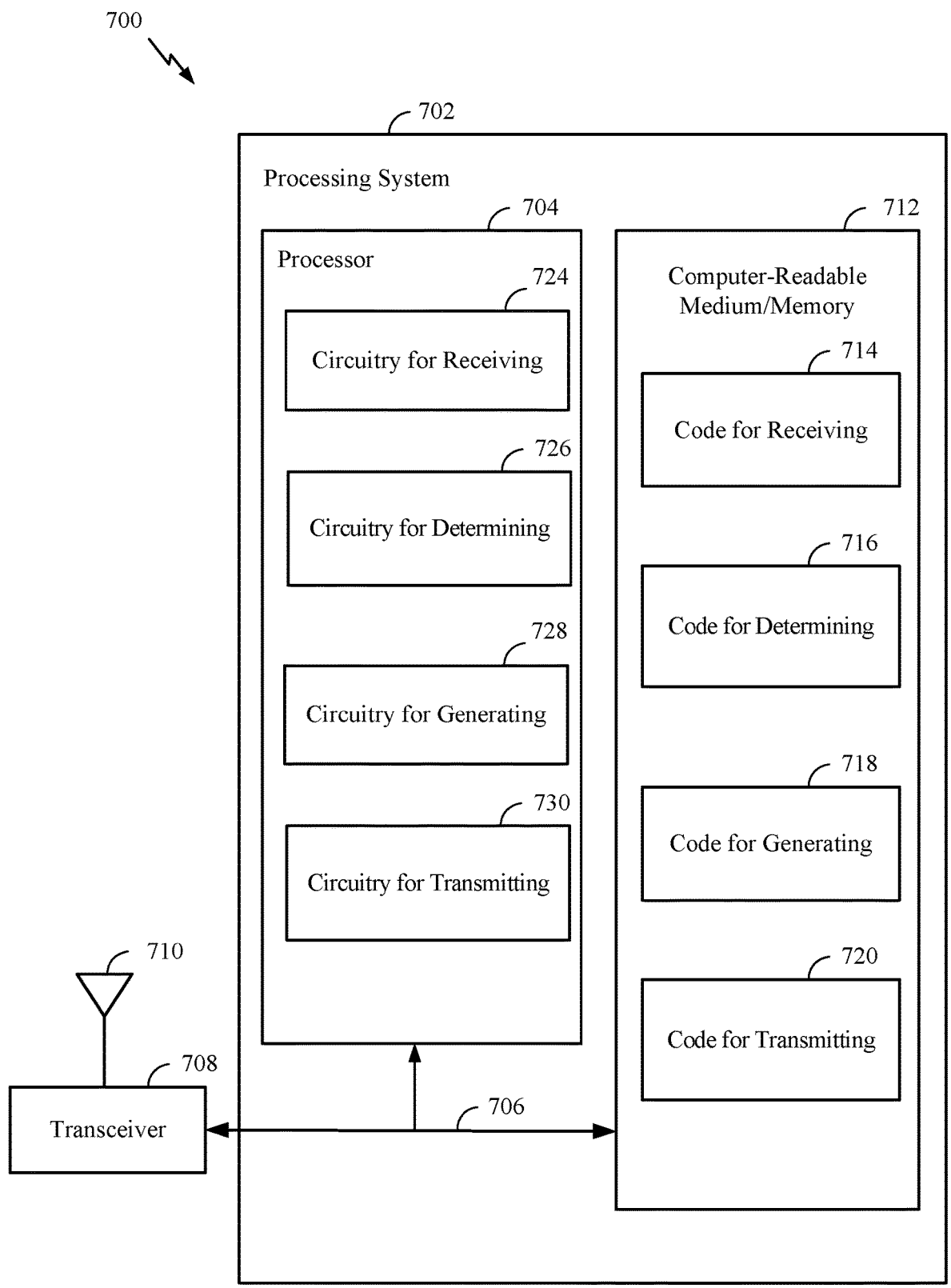
FIG. 7 illustrates a communications device that may include various components configured to perform operations for the techniques disclosed herein, in accordance with aspects of the present disclosure.

FIG. 7 illustrates a communications device 700 that may include various components (e.g., corresponding to means-plus-function components) operable, configured, or adapted to perform operations for the techniques disclosed herein, such as the operations illustrated in FIG. 4. In some examples, communication device 700 may be a BS, such as BS 110a as described, for example with respect to FIGS. 1 and 2.

Communications device 700 includes a processing system 702 (e.g., corresponding to controller/processor 240) coupled to a transceiver 708 (e.g., a transmitter and/or a receiver). The transceiver 708 may correspond to one or more of the transmit processor 220, TX MIMO processor 230, modulator/demodulator 232, the receive processor 238, and the MIMO detector 236. Transceiver 708 is configured to transmit and receive signals for the communications device 700 via an antenna 710 (e.g., corresponding to antenna 234), such as the various signals as described herein. Processing system 702 may be configured to perform processing functions for the communications device 700, including processing signals received and/or to be transmitted by the communications device 700.

Processing system 702 includes one or more processors 704 coupled to a computer-readable medium/memory 712 via a bus 706. In certain aspects, the computer-readable medium/memory 712 is configured to store instructions (e.g., computer-executable code) that when executed by the one or more processors 704, instruct or cause the one or more processors 704 to perform the operations illustrated in FIG. 4, or other operations for performing the various techniques discussed herein for control channel communication.

In certain aspects, computer-readable medium/memory 712 (e.g., corresponding to memory 242) stores code 714 (an example means for) for receiving; code 716 (an example means for) for determining; code 718 (an example means for) for generating; and code 720 for transmitting.

In certain aspects, code 714 for receiving may include code for receiving, from a user equipment (UE), a recommendation of a threshold to be used. In certain aspects, code 716 for determining may include code for determining said time threshold by considering the recommendation from the UE. In certain aspects, code 718 for generating may include code for generating a resource element group (REG) bundle for channel estimation, the REG bundle having a plurality of REGs to be transmitted in a plurality of monitoring occasions. In certain aspects, code 720 for transmitting may include code for transmitting, to a user equipment (UE), the REG bundle using the plurality of monitoring occasions. In certain aspects, code 720 for transmitting may include code for transmitting first signaling for configuring the UE with the plurality of monitoring occasions to be aggregated, wherein the configuration also activates usage of the REG bundle implemented across the plurality of monitoring occasions. In certain aspects, code 720 for transmitting may include code for transmitting first signaling for configuring the UE with the plurality of monitoring occasions to be aggregated. In certain aspects, code 720 for transmitting may include code for transmitting second signaling activating usage of the REG bundle implemented across the plurality of monitoring occasions, wherein: the first signaling comprises RRC signaling; and the second signaling comprises medium access control (MAC)-control element (CE) signaling, UE-specific downlink control information (DCI), or group-common DCI.

In certain aspects, the processor 704 has circuitry configured to implement the code stored in the computer-readable medium/memory 712. The processor 704 includes circuitry 724 (an example means for) for receiving; circuitry 726 (an example means for) for determining; circuitry 728 (an example means for) for generating; and circuitry 730 (an example means for) for transmitting.

In certain aspects, circuitry 724 for receiving may include circuitry for receiving, from a UE, a recommendation of a threshold to be used. In certain aspects, circuitry 726 for determining may include circuitry for determining said time threshold by considering the recommendation from the UE. In certain aspects, circuitry 728 for generating may include circuitry for generating a REG bundle for channel estimation, the REG bundle having a plurality of REGs to be transmitted in a plurality of monitoring occasions. In certain aspects, circuitry 730 for transmitting may include circuitry for transmitting, to a UE, the REG bundle using the plurality of monitoring occasions. In certain aspects, circuitry 730 for transmitting may include circuitry for transmitting first signaling for configuring the UE with the plurality of monitoring occasions to be aggregated, wherein the configuration also activates usage of the REG bundle implemented across the plurality of monitoring occasions. In certain aspects, circuitry 730 for transmitting may include circuitry for transmitting first signaling for configuring the UE with the plurality of monitoring occasions to be aggregated. In certain aspects, circuitry 730 for transmitting may include circuitry for transmitting second signaling activating usage of the REG bundle implemented across the plurality of monitoring occasions, wherein: the first signaling comprises RRC signaling; and the second signaling comprises medium access control (MAC)-control element (CE) signaling, UE-specific downlink control information (DCI), or group-common DCI.

Figure 8:
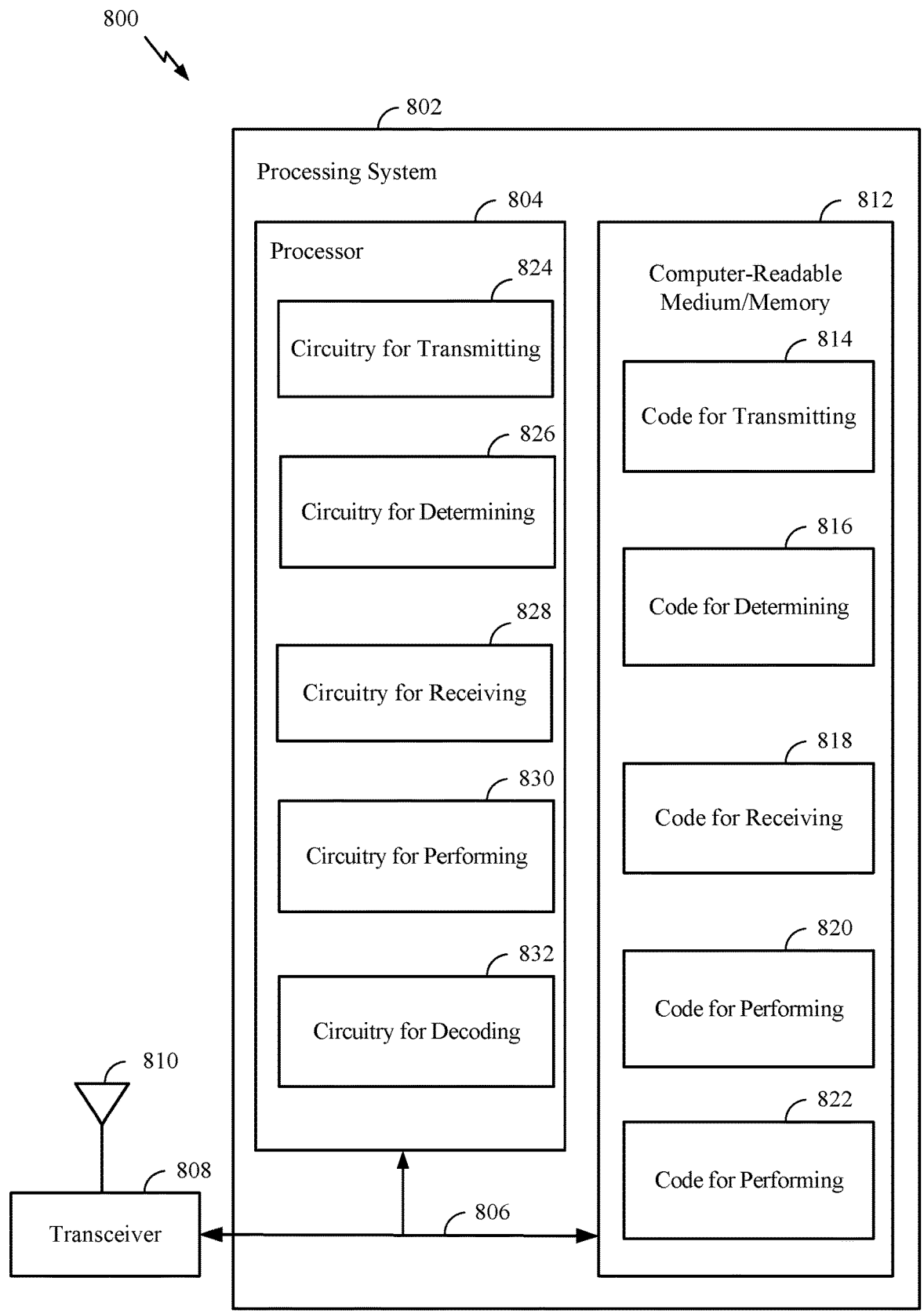
FIG. 8 illustrates a communications device that may include various components configured to perform operations for the techniques disclosed herein, in accordance with aspects of the present disclosure.

FIG. 8 illustrates a communications device 800 that may include various components (e.g., corresponding to means-plus-function components) operable, configured, or adapted to perform operations for the techniques disclosed herein, such as the operations illustrated in FIG. 5. In some examples, communication device 800 may be a UE, such as UE 120a as described, for example with respect to FIGS. 1 and 2.

Communications device 800 includes a processing system 802 (e.g., corresponding to controller/processor 240 or 280) coupled to a transceiver 808 (e.g., a transmitter and/or a receiver). The transceiver 808 may correspond to one or more of the transmit processor 264, TX MIMO processor 266, modulator/demodulator 254, the receive processor 258, and the MIMO detector 256. Transceiver 808 is configured to transmit and receive signals for the communications device 800 via an antenna 810 (e.g., corresponding to antenna 252), such as the various signals as described herein. Processing system 802 may be configured to perform processing functions for the communications device 800, including processing signals received and/or to be transmitted by the communications device 800.

Processing system 802 includes one or more processors 804 coupled to a computer-readable medium/memory 812 via a bus 806. In certain aspects, the computer-readable medium/memory 812 is configured to store instructions (e.g., computer-executable code) that when executed by the one or more processors 804, instruct or cause the one or more processors 804 to perform the operations illustrated in FIG. 5, or other operations for performing the various techniques discussed herein for control channel communication.

In certain aspects, computer-readable medium/memory 812 (e.g., corresponding to memory 282) stores code 814 (an example means for) for transmitting; code 816 (an example means for) for determining; code 818 (an example means for) for receiving; code 820 (an example means for) for performing; and code 822 (an example means for) for decoding.

In certain aspects code 814 for transmitting may include code for transmitting, to a BS, a recommendation of a threshold to be used. In certain aspects code 816 for determining may include code for determining the recommendation based on at least one of: a mobility state of the UE; or whether phase continuity may be maintained across the plurality of monitoring occasions. In certain aspects code 818 for receiving may include code for receiving a REG bundle for channel estimation, the REG bundle having a plurality of REGs to be received in a plurality of monitoring occasions. In certain aspects code 818 for receiving may include code for receiving an indication of a time threshold from a BS. In certain aspects code 818 for receiving may include code for receiving first signaling for configuring the UE with the plurality of monitoring occasions to be aggregated, wherein the configuration also activates usage of the REG bundle implemented across the plurality of monitoring occasions. In certain aspects code 818 for receiving may include code for receiving first signaling for configuring the UE with the plurality of monitoring occasions to be aggregated. In certain aspects, code 818 for receiving may include code for receiving second signaling activating usage of the REG bundle implemented across the plurality of monitoring occasions, wherein: the first signaling comprises RRC signaling; and the second signaling comprises MAC-CE signaling, UE-specific DCI, or group-common DCI. In certain aspects code 820 for performing may include code for performing the channel estimation based on the REG bundle. In certain aspects code 822 for decoding may include code for decoding a control channel based on the channel estimation.

In certain aspects, the processor 804 has circuitry configured to implement the code stored in the computer-readable medium/memory 812. The processor 804 includes circuitry 824 (an example means for) for transmitting; circuitry 826 (an example means for) for determining; circuitry 828 (an example means for) for receiving; circuitry 830 for performing; and circuitry 832 (an example means for) for decoding.

In certain aspects circuitry 824 for transmitting may include circuitry for transmitting, to a BS, a recommendation of a threshold to be used. In certain aspects circuitry 826 for determining may include circuitry for determining the recommendation based on at least one of: a mobility state of the UE; or whether phase continuity may be maintained across the plurality of monitoring occasions. In certain aspects circuitry 828 for receiving may include circuitry for receiving a REG bundle for channel estimation, the REG bundle having a plurality of REGs to be received in a plurality of monitoring occasions. In certain aspects circuitry 828 for receiving may include circuitry for receiving an indication of a time threshold from a BS. In certain aspects circuitry 828 for receiving may include circuitry for receiving first signaling for configuring the UE with the plurality of monitoring occasions to be aggregated, wherein the configuration also activates usage of the REG bundle implemented across the plurality of monitoring occasions. In certain aspects circuitry 828 for receiving may include circuitry for receiving first signaling for configuring the UE with the plurality of monitoring occasions to be aggregated. In certain aspects, circuitry 828 for receiving may include circuitry for receiving second signaling activating usage of the REG bundle implemented across the plurality of monitoring occasions, wherein: the first signaling comprises RRC signaling; and the second signaling comprises MAC-CE signaling, UE-specific DCI, or group-common DCI. In certain aspects circuitry 830 for performing may include circuitry for performing the channel estimation based on the REG bundle. In certain aspects circuitry 832 for decoding may include circuitry for decoding a control channel based on the channel estimation.

The REG bundle manager 122 or 112 may support wireless communication in accordance with examples as disclosed herein.

The REG bundle manager 122 or 112 may be an example of means for performing various aspects described herein. The REG bundle manager 122 or 112, or its sub-components, may be implemented in hardware (e.g., in uplink (UL) resource management circuitry). The circuitry may comprise of processor, DSP, an ASIC, a FPGA or other programmable logic device, discrete gate or transistor logic, discrete hardware components, or any combination thereof designed to perform the functions described in the present disclosure.

In another implementation, the REG bundle manager 122 or 112, or its sub-components, may be implemented in code (e.g., as configuration management software or firmware) executed by a processor, or any combination thereof. If implemented in code executed by a processor, the functions of the REG bundle manager 122 or 112, or its sub-components may be executed by a general-purpose processor, a DSP, an ASIC, a FPGA or other programmable logic device.

In some examples, the REG bundle manager 122 or 112 may be configured to perform various operations (e.g., receiving, determining, transmitting) using or otherwise in cooperation with the transceiver 708 or 808.

The REG bundle manager 122 or 112, or its sub-components, may be physically located at various positions, including being distributed such that portions of functions are implemented at different physical locations by one or more physical components. In some examples, the REG bundle manager 122 or 112, or its sub-components, may be a separate and distinct component in accordance with various aspects of the present disclosure. In some examples, the REG bundle manager 122 or 112, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

EXAMPLE CLAUSES

Implementation examples are described in the following numbered clauses:

Clause 1. A method for wireless communication by a base station (BS), comprising: generating a resource element group (REG) bundle for channel estimation, the REG bundle having a plurality of REGs to be transmitted in a plurality of monitoring occasions; and transmitting, to a user equipment (UE), the REG bundle using the plurality of monitoring occasions.

Clause 2. The method of Clause 1, wherein the plurality of monitoring occasions are associated with the same set of frequency resource blocks (RBs).

Clause 3. The method of Clause 1 or 2, wherein the plurality of REGs of the REG bundle are generated using the same precoder.

Clause 4. The method of any of Clauses 1-3, wherein the REG bundle is generated based on whether a distance in time between the plurality of monitoring occasions is less than a time threshold.

Clause 5. The method of Clause 4, wherein the time threshold comprises a quantity of symbols.

Clause 6. The method of Clause 4 or 5, wherein the time threshold comprises an absolute time length.

Clause 7. The method of any of Clauses 4-6, further comprising transmitting an indication of the time threshold to the UE.

Clause 8. The method of any of Clauses 4-7, further comprising: receiving, from the UE, a recommendation of a threshold to be used; and determining said time threshold by considering the recommendation from the UE.

Clause 9. The method of Clause 8, wherein the recommendation is determined based on a mobility state of the UE.

Clause 10. The method of Clause 8 or 9, wherein the recommendation is determined based on whether phase continuity may be maintained across the plurality of monitoring occasions.

Clause 11. The method of any of Clauses 8-10, wherein the recommendation is determined based on at least one of: a mobility state of the UE; or whether phase continuity may be maintained across the plurality of monitoring occasions.

Clause 12. The method of any of Clauses 1-11, wherein the REG bundle is generated based on whether the plurality of monitoring occasions are in the same slot.

Clause 13. The method of any of Clauses 1-12, further comprising transmitting first signaling for configuring the UE with the plurality of monitoring occasions to be aggregated, wherein the configuration also activates usage of the REG bundle implemented across the plurality of monitoring occasions.

Clause 14. The method of any of Clauses 1-13, further comprising: transmitting first signaling for configuring the UE with the plurality of monitoring occasions to be aggregated; and transmitting second signaling activating usage of the REG bundle implemented across the plurality of monitoring occasions, wherein: the first signaling comprises radio resource control (RRC) signaling; and the second signaling comprises medium access control (MAC)-control element (CE) signaling, UE-specific downlink control information (DCI), or group-common DCI.

Clause 15. The method of any of Clauses 1-14, further comprising transmitting first signaling for configuring the UE with the plurality of monitoring occasions to be aggregated.

Clause 16. The method of Clause 15, wherein the configuration also activates usage of the REG bundle implemented across the plurality of monitoring occasions.

Clause 17. The method of Clause 15 or 16, further comprising transmitting second signaling activating usage of the REG bundle implemented across the plurality of monitoring occasions.

Clause 18. The method of any of Clauses 15-17, wherein at least one of the first signaling or the second signaling comprises RRC signaling, MAC-CE signaling, UE-specific DCI, or group-common DCI.

Clause 19. The method of any of Clauses 1-18, wherein the REG bundle is generated based on one or more conditions, the one or more conditions being associated with: a size of a control resource set (CORESET) to be transmitted via the plurality of monitoring occasions; a size of the REG bundle; a type of the REG bundle; a frequency range associated with the plurality of monitoring occasions; a subcarrier spacing associated with the plurality of monitoring occasions; a type of a search space including the plurality of monitoring occasions; a format of a slot in which the plurality of monitoring occasions are configured; whether uplink (UL) resources are configured between the plurality of monitoring occasions in time; or any combination thereof.

Clause 20. A method for wireless communication by a user equipment (UE), comprising: receiving a resource element group (REG) bundle for channel estimation, the REG bundle having a plurality of REGs to be received in a plurality of monitoring occasions; performing the channel estimation based on the REG bundle; and decoding a control channel based on the channel estimation.

Clause 21. The method of Clause 20, wherein the plurality of monitoring occasions are associated with the same set of frequency resource blocks (RBs).

Clause 22. The method of Clause 20 or 21, wherein the plurality of REGs of the REG bundle are generated using the same precoder.

Clause 23. The method of claim 20, wherein the REG bundle is used for the channel estimation based on whether a distance in time between the plurality of monitoring occasions is less than a time threshold.

Clause 24. The method of Clause 23, wherein the time threshold comprises a quantity of symbols.

Clause 25. The method of Clause 23 or 24, wherein the time threshold comprises an absolute time length.

Clause 26. The method of any of Clauses 23-25, further comprising receiving an indication of the time threshold from a base station (BS).

Clause 27. The method of any of Clauses 23-26, further comprising transmitting, to a BS, a recommendation of a threshold to be used.

Clause 28. The method of Clause 27, further comprising determining the recommendation based on a mobility state of the UE.

Clause 29. The method of Clause 27 or 28, further comprising determining the recommendation based on whether phase continuity may be maintained across the plurality of monitoring occasions.

Clause 30. The method of any of Clauses 27-29, further comprising determining the recommendation based on at least one of: a mobility state of the UE; or whether phase continuity may be maintained across the plurality of monitoring occasions.

Clause 31. The method of any of Clauses 20-30, further comprising receiving first signaling for configuring the UE with the plurality of monitoring occasions to be aggregated, wherein the configuration also activates usage of the REG bundle implemented across the plurality of monitoring occasions.

Clause 32. The method of any of Clauses 20-31, further comprising: receiving first signaling for configuring the UE with the plurality of monitoring occasions to be aggregated; and receiving second signaling activating usage of the REG bundle implemented across the plurality of monitoring occasions, wherein: the first signaling comprises radio resource control (RRC) signaling; and the second signaling comprises medium access control (MAC)-control element (CE) signaling, UE-specific downlink control information (DCI), or group-common DCI.

Clause 33. The method of any of Clauses 20-32, wherein the REG bundle is used for the channel estimation based on whether the plurality of monitoring occasions are in the same slot.

Clause 34. The method of any of Clauses 20-33, further comprising receiving first signaling for configuring the UE with the plurality of monitoring occasions to be aggregated.

Clause 35. The method of Clause 34, wherein the configuration also activates usage of the REG bundle implemented across the plurality of monitoring occasions.

Clause 36. The method of claim 34, further comprising receiving second signaling activating usage of the REG bundle implemented across the plurality of monitoring occasions.

Clause 37. The method of any of Clauses 34-36, wherein at least one of the first signaling or the second signaling comprises RRC signaling, MAC-CE signaling, UE-specific DCI, or group-common DCI.

Clause 38. The method of any of Clauses 20-37, wherein the REG bundle is used to perform the channel estimation based on one or more conditions, the one or more conditions being associated with: a size of a control resource set (CORESET) to be transmitted via the plurality of monitoring occasions; a size of the REG bundle; a type of the REG bundle; a frequency range associated with the plurality of monitoring occasions; a subcarrier spacing associated with the plurality of monitoring occasions; a type of a search space including the plurality of monitoring occasions; a format of a slot in which the plurality of monitoring occasions are configured; whether uplink (UL) resources are configured between the plurality of monitoring occasions in time; or any combination thereof.

Clause 39: An apparatus, comprising: a memory; and one or more processors coupled to the memory, the one or more processors and the memory being configured to perform a method in accordance with any one of Clauses 1-38.

Clause 40: An apparatus, comprising means for performing a method in accordance with any one of Clauses 1-38.

Clause 41: A non-transitory computer-readable medium comprising executable instructions that, when executed by one or more processors of an apparatus, cause the apparatus to perform a method in accordance with any one of Clauses 1-38.

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and B S, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4-5.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a base station (BS), comprising:
   transmitting, to a user equipment (UE), an indication of a time threshold indicating a maximum allowable temporal distance between monitoring occasions of a search space for generating a resource element group (REG) bundle for channel estimation;
   generating the REG bundle when a temporal distance between the monitoring occasions of the search space is less than the time threshold, wherein the REG bundle includes a plurality of REGs to be transmitted in the monitoring occasions of the search space;

transmitting, to the UE, the REG bundle using the monitoring occasions of the search space.

2. The method of claim 1, wherein the monitoring occasions are associated with the same set of frequency resource blocks (RBs).

3. The method of claim 1, wherein the plurality of REGs of the REG bundle are generated using the same precoder.

4. The method of claim 1, further comprising:
receiving, from the UE, a recommendation of the time threshold to be used; and
determining the time threshold by considering the recommendation from the UE.

5. The method of claim 4, wherein the recommendation is based on at least one of:
a mobility state of the UE; or
whether phase continuity may be maintained across the monitoring occasions.

6. The method of claim 1, wherein the REG bundle is generated based on whether the monitoring occasions are in the same slot.

7. The method of claim 1, further comprising transmitting first signaling for configuring the UE with the monitoring occasions to be aggregated, wherein the configuration also activates usage of the REG bundle implemented across the monitoring occasions.

8. The method of claim 1, further comprising:
transmitting first signaling for configuring the UE with the monitoring occasions to be aggregated; and
transmitting second signaling activating usage of the REG bundle implemented across the monitoring occasions, wherein:
the first signaling comprises RRC signaling; and
the second signaling comprises medium access control (MAC)-control element (CE) signaling, UE-specific downlink control information (DCI), or group-common DCI.

9. The method of claim 1, wherein the REG bundle is generated based on one or more conditions, the one or more conditions being associated with:
a size of a control resource set (CORESET) to be transmitted via the monitoring occasions;
a size of the REG bundle;
a type of the REG bundle;
a frequency range associated with the monitoring occasions;
a subcarrier spacing associated with the monitoring occasions;
a type of the search space;
a format of a slot in which the monitoring occasions are configured;
whether uplink (UL) resources are configured between the monitoring occasions in time; or
any combination thereof.

10. A method for wireless communication by a user equipment (UE), comprising:
receiving an indication of a time threshold indicating a maximum allowable temporal distance between monitoring occasions of a search space for generating a resource element group (REG) bundle for channel estimation;
receiving the REG bundle, comprising a plurality of REGs, in the monitoring occasions of the search space;
performing channel estimation based on the REG bundle when a temporal distance between the monitoring occasions of the search space is less than the time threshold; and
decoding a control channel based on the channel estimation.

11. The method of claim 10, wherein the monitoring occasions are associated with the same set of frequency resource blocks (RBs).

12. The method of claim 10, wherein the plurality of REGs of the REG bundle are generated using the same precoder.

13. The method of claim 10, further comprising transmitting, to a BS, a recommendation of the time threshold to be used.

14. The method of claim 13, further comprising determining the recommendation based on at least one of:
a mobility state of the UE; or
whether phase continuity may be maintained across the monitoring occasions.

15. The method of claim 10, wherein the REG bundle is used for the channel estimation based on whether the monitoring occasions are in the same slot.

16. The method of claim 10, further comprising receiving first signaling for configuring the UE with the monitoring occasions to be aggregated, wherein the configuration also activates usage of the REG bundle implemented across the monitoring occasions.

17. The method of claim 10, further comprising:
receiving first signaling for configuring the UE with the monitoring occasions to be aggregated; and
receiving second signaling activating usage of the REG bundle implemented across the monitoring occasions, wherein:
the first signaling comprises radio resource control (RRC) signaling; and
the second signaling comprises medium access control (MAC)-control element (CE) signaling, UE-specific downlink control information (DCI), or group-common DCI.

18. The method of claim 10, wherein the REG bundle is used to perform the channel estimation based on one or more conditions, the one or more conditions being associated with:
a size of a control resource set (CORESET) to be transmitted via the monitoring occasions;
a size of the REG bundle;
a type of the REG bundle;
a frequency range associated with the monitoring occasions;
a subcarrier spacing associated with the monitoring occasions;
a type of the search space;
a format of a slot in which the monitoring occasions are configured;
whether uplink (UL) resources are configured between the monitoring occasions in time; or
any combination thereof.

19. An apparatus for wireless communication by a base station (BS), comprising:
one or more processors configured to execute instructions stored on one or more memories to cause the BS to:
transmit, to a user equipment (UE), an indication of a time threshold indicating a maximum allowable temporal distance between monitoring occasions of a search space for generating a resource element group (REG) bundle for channel estimation
generate the REG bundle when a temporal distance between the monitoring occasions of the search space is less than the time threshold, wherein the REG bundle includes a plurality of REGs to be transmitted in the monitoring occasions of the search space;

transmit, to the UE, the REG bundle using the monitoring occasions of the search space.

20. The apparatus of claim 19, wherein the monitoring occasions are associated with the same set of frequency resource blocks (RBs).

21. The apparatus of claim 19, wherein the plurality of REGs of the REG bundle are generated using the same precoder.

22. An apparatus for wireless communication by a user-equipment (UE), comprising:

one or more processors configured to execute instructions stored on one or more memories to cause the UE to:
receive an indication of a time threshold indicating a maximum allowable temporal distance between monitoring occasions of a search space for generating a resource element group (REG) bundle for channel estimation;
receive the REG bundle, comprising a plurality of REGs, in the monitoring occasions of the search space;
perform channel estimation based on the REG bundle when a temporal distance between the monitoring occasions of the search space is less than the time threshold; and
decode a control channel based on the channel estimation.

23. The apparatus of claim 22, wherein the monitoring occasions are associated with the same set of frequency resource blocks (RBs).

24. The apparatus of claim 22, wherein the plurality of REGs of the REG bundle are generated using the same precoder.

25. The apparatus of claim 22, wherein the one or more processors and memories are further configured to receive first signaling for configuring the UE with the monitoring occasions to be aggregated, wherein the configuration also activates usage of the REG bundle implemented across the monitoring occasions.

26. The apparatus of claim 22, wherein the one or more processors and memories are further configured to:
receive first signaling for configuring the UE with the monitoring occasions to be aggregated; and
receive second signaling activating usage of the REG bundle implemented across the monitoring occasions, wherein:
the first signaling comprises radio resource control (RRC) signaling; and
the second signaling comprises medium access control (MAC)-control element (CE) signaling, UE-specific downlink control information (DCI), or group-common DCI.

* * * * *